United States Patent
Cope et al.

(10) Patent No.: US 9,384,495 B1
(45) Date of Patent: Jul. 5, 2016

(54) OPTICAL INDICIA FOR INDEXING AND CHECK-IN

(71) Applicant: Sprint Communications Company L.P., Overland Park, KS (US)

(72) Inventors: Warren B. Cope, Olathe, KS (US); Manoj Monga, Olathe, KS (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 131 days.

(21) Appl. No.: 13/679,766

(22) Filed: Nov. 16, 2012

(51) Int. Cl.
G06Q 30/02 (2012.01)
H04B 10/11 (2013.01)

(52) U.S. Cl.
CPC ........ G06Q 30/0241 (2013.01); G06Q 30/0267 (2013.01); G06Q 30/0277 (2013.01); H04B 10/11 (2013.01)

(58) Field of Classification Search
CPC ... G06Q 10/30; G06Q 30/0237; G06Q 30/02; G06Q 30/0278; G06Q 20/382
USPC ............................................ 705/14.64, 14.37
See application file for complete search history.

(56) References Cited

U.S. PATENT DOCUMENTS

| | | | | |
|---|---|---|---|---|
| 5,760,383 A * | 6/1998 | Heske, III | ................. | 235/462.16 |
| 6,148,331 A * | 11/2000 | Parry | ............................ | 709/218 |
| 6,889,903 B1 * | 5/2005 | Koenck | ..................... | 235/462.01 |
| 7,437,051 B1 | 10/2008 | Cook et al. | | |
| 8,503,886 B1 | 8/2013 | Gunasekara et al. | | |
| 2001/0029555 A1 | 10/2001 | David | | |
| 2004/0110517 A1 * | 6/2004 | Ellman | ......................... | 455/466 |
| 2005/0207726 A1 | 9/2005 | Chen | | |
| 2006/0080111 A1 * | 4/2006 | Homeier-Beals | ................. | 705/1 |
| 2007/0073585 A1 * | 3/2007 | Apple et al. | ..................... | 705/14 |
| 2008/0024681 A1 | 1/2008 | Ryu et al. | | |
| 2008/0097855 A1 * | 4/2008 | Rissanen | ........................ | 705/14 |
| 2008/0195409 A1 * | 8/2008 | Shankland | ........................ | 705/1 |
| 2009/0152445 A1 * | 6/2009 | Gardner, Jr. | ............ | 250/214 AL |
| 2010/0250359 A1 * | 9/2010 | Gillenson et al. | .......... | 705/14.25 |
| 2012/0136698 A1 * | 5/2012 | Kent | ............................ | 705/14.1 |
| 2012/0187184 A1 * | 7/2012 | Challa et al. | .................. | 235/375 |
| 2012/0284012 A1 * | 11/2012 | Rodriguez et al. | ................ | 704/1 |
| 2013/0080239 A1 * | 3/2013 | Okerlund | .................... | 705/14.33 |
| 2014/0308048 A1 * | 10/2014 | Roberts et al. | ................ | 398/187 |

OTHER PUBLICATIONS

Kates, Jesse M., et al., Patent Application entitled "Method and System for Managing Wireless Devices Using Short-Range Wireless Communication", filed Nov. 16, 2009, U.S. Appl. No. 12/619,317.
Cope, Warren B., Patent Application entitled "Systems and Methods for Restricting One of More Communication Functions of a Wireless Device", filed Nov. 4, 2010, U.S. Appl. No. 12/939,366.

* cited by examiner

Primary Examiner — Namrata (Pinky) Boveja
Assistant Examiner — Michael Ezewoko (57) ABSTRACT

Portable mobile devices may have ambient light sensors (ALS) capable of modulating the level of backlight on the display of the portable electronic device in various environmental situations. The ALS is capable of receiving an infrared signal or a visible light signal that may then be read to determine an end and a beginning, and parsed to extract the code. The information sent from the infrared or visible light source to the portable electronic device may be handled by the device in various ways including direct processing and display to present the user of the portable electronic device with a coupon, offer, or other benefit. This may occur in several ways including displaying a coupon or an offer, launching a URL or URI, or launching an application on the portable electronic device.

20 Claims, 7 Drawing Sheets

OPTICAL INDICIA FOR INDEXING AND CHECK-IN

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The transfer of information to and from mobile devices including tablets, laptops, mobile phones, and other portable electronic devices can be accomplished by methods including Wi-Fi, Bluetooth®, and near-field communications (NFC). As the use of portable electronic devices increases and the types of activities that these devices are used for broadens, the applications of wireless communication for mobile devices continue to develop.

SUMMARY

An embodiment of a method of one-way communication transmission, comprising: sensing, by an ambient light sensor (ALS) embedded in a portable electronic device, an infrared signal and parsing, by the portable electronic device, the infrared signal. In the same embodiment, extracting, by the portable electronic device, at least one indicia from the IR signal based on the parsing; displaying, by the portable electronic device, in response to the extracting, at least one benefit from at least one vendor of a plurality of vendors.

An alternate embodiment of a method of a portable electronic device receiving a one-way light communication signal, comprising: sensing, by an ambient light sensor (ALS) embedded in a portable electronic device, an infrared signal and parsing, by the portable electronic device, the infrared signal. In this embodiment, extracting, by the portable electronic device, at least one indicia from the infrared signal based on the parsing, and executing, by the portable electronic device, in response to extracting the at least one indicia, an application on the portable electronic device. The embodiment further comprising connecting, using a cellular communication transceiver, to a network via a base transceiver station; requesting, by the portable electronic device, content referenced by at least one of a uniform resource locator (URL) and a uniform resource indicator (URI), wherein requesting the content displays material from the URL or URI on the portable electronic device.

An embodiment of a system for receiving information comprising: an infrared signal, wherein the infrared signal is generated by at least one of a stationary kiosk or a portable signal generator; a portable electronic device comprising: an ambient light sensor, and a first application. In this embodiment, the first application executes in response to the ambient light sensor receiving the infrared signal, and the first application demodulates the infrared signal to extract at least one of an indicia of a plurality of indicia and a coded signal of a plurality of coded signals transmitted by the infrared signal. The embodiment further comprising a second application, wherein the second application is launched in response to the extraction of the at least one indicia.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The use of NFC technology allows a user to receive information from remote sources such as vendors, event planners, and party promoters such as discounts, tickets, offers, or other benefits. However, NFC technology may be logistically and financially undesirable based upon the high cost of implementation and the physical requirements for installing NFC on portable electronic devices. The use of a technology that already exists in most portable electronic devices, such as ambient light sensors (ALS), to receive a one-way transmission of information from a vendor, event organizer, public relations professional or other promoter may allow users of portable electronic devices to receive benefits, offers, and other information by putting their phone in contact with an infrared signal.

Portable computing devices such as mobile phones, tablets, laptops may be used to send and receive information related not only to daily activities through email and messaging, but also to send and receive information from commercial third parties. These commercial third parties may be providers of goods and/or services such as car rental, hotels, sporting events, cultural events, musical events, museums, expos, restaurants, and medical or insurance providers as well as social media websites or services. However, NFC may use specific hardware and software on the device as well as point of presence equipment. In addition, NFC may not be used with all portable electronic devices and may only be available on select devices and not mainstream devices because of the expense involved in making a phone NFC-ready. Providers of goods and services as well as entities that engage in exhibits and expositions or demonstrations to promote their products may offer enhanced services to mobile customers. In these situations, NFC technology or Quick Response Code (QR) may not be practical to use given the expense of those technologies or the imprecise implementation of, for example, a QR code system.

Therefore, implementing a system to bring offers and information to the users of portable electronic devices may be accomplished by using a feature already present on the majority of portable electronics. Ambient light sensors (ALS), for example, may be present in more phones than NFC technology. Conventionally, an ALS may be used by communication devices to determine an averaged or smoothed lighting level, for example, the visible lighting level, and adapt the display brightness of the device based on that determined visible light level. When the visible light level is relatively high, the display of the device may be set to a relatively high brightness level to provide sufficient contrast for a user to see the display. When the visible light level is relatively low, however, the display of the device may be set to a relatively low brightness level while continuing to provide sufficient contrast for the user to see the display. This functionality can promote reducing battery depletion by avoiding using unnecessary display brightness during low visible light conditions. As known to one of ordinary skill in the art, providing users with satisfactory battery life duration between re-charging is a continuing challenge for mobile communication devices.

When a "light event" occurs and is sensed by an application attached to the ambient light sensor handler, the application may execute a demodulation procedure to extract the indicia or code signal transmitted from the stimulator. The demodulation procedure may also be referred to as an application. The indicia could then either resolve to a Uniform Resource Locator (URL), a Uniform Resource Identifier (URI), or process the code directly. The signal sent to the portable electronic device may have a beginning and an end, for example, start bits, stop bits, framing symbols, or other structural signal elements, that are sensed by the demodulation procedure and parsed to determine the content. A "light event" may be smooth or modulated, for example, dimming or brightening of the surrounding light. The light event may also be a sudden dimming or brightening of the surrounding light, for example, when something or someone passes by the sensor or when the user of the device passes through a tunnel or under a bridge. In addition, a light signal or pulse, for example, visible light or an IR signal or pulse may also be a light event and may act as a trigger.

In an embodiment, the infrared signal or pulse sent to the portable electronic device identifies a start and an end of a data word or code embedded in the light signal. The components of that word or signal may be parsed and the word or code decoded and the decoded information may result in the display of a coupon or offer, the display or a URL or URI, or launch another application on the portable electronic device. In an embodiment, the output of the ambient light sensor may be interpreted in two different ways or two different stages of processing.

When a light event is received by the ambient light sensor, the output of the ambient light sensor may be interpreted as a light signal embedding a relatively dense sequence of coded signals or, in another way of speaking, a relatively high information rate sequence of coded signals (relative to the average rate of change of ambient light). For example, when a light event is received, the output of the ambient light sensor may be parsed as a light signal comprising framing bits, start bits, stop bits, and information bits, for example information bits that may comprise a URL or URI reference. After the light signal is completed, for example after a stop bit sequence is received or after some other indication of completion, the processing of the output of the ambient light sensor may return to the normal stage or mode of processing the output of the ambient light sensor. A light event may be a sequence of relatively long term, large scale swings in ambient light, for example bright for 2 seconds, dim for 2 seconds, bright for 2 seconds, and dim for 2 seconds. Because the output of the ambient light sensor is processed differently when triggered by the light event and before it is deemed that the light signal has completed, the ambient light sensor may be said to be operated in two different modes or stages or that the output of the ambient light sensor is processed in according to two different modes or stages of processing.

In an embodiment, if a user walks into a coffee shop and places their phone near, by, or under, an IR pulse, the user may receive a coupon delivered by one-way IR transmission to the user's phone which they could then take to an employee of the store and have it scanned for a discount or other benefit. As taught herein, the ALS may be used to a different purpose, for example, to receive one-way communication encoded in an optical signal such as an infrared signal (IR). For example, a bar code provided by the coupon may be presented on a display of the portable electronic device and that presented bar code may be scanned. An alternate benefit could be a frequent shopper system wherein the portable electronic device receives a point or credit and when an application on the phone counts the credits or points and determines that a certain number of credits or points are reached, the user may receive a benefit. Another alternate benefit could be a give-away, for example, if a free meal is given out every week at a particular restaurant, a user could place their phone in communication with the IR pulse in the hopes of being awarded a benefit. In another example, a user who purchases items or services may receive an IR pulse upon checkout which provides them with a coupon to use for that purchase, a future purchase, or alerts them of upcoming sales or other discount programs.

In another example, the IR pulse received by the portable electronic device could take the user to a URL or URI. This web page may have product information, for example, if a user attends a museum and receives an IR pulse, this may take them to a website that contains audio information about an exhibit or exhibits. In an embodiment, this audio information may contain an additional benefit at the end of the exhibit information such as a coupon or advance information about a pending exhibit. In another example, at a designer's trunk show, which may be where a designer of goods previews a new or limited collection of goods, a party may receive an IR pulse on their device and be taken to a web page that displays the entire collection that may not be available to the public. In that embodiment, the user may be given the option to purchase items from that collection prior to the public or at a discount, or may be given the option to receive future alerts for sales or new collections. In another example, a party may enter a restaurant that may be stand-alone or part of a chain and may receive an IR pulse that takes them to a web page with a special menu or an invitation to the chef's table which may be a private room with a private, and possibly higher-end, menu.

In another example, the IR pulse received by the portable electronic device may process the code directly. For example, if a find-my-car application is already on a phone, an IR pulse may record the location of a user's car when they exit a parking lot or a particular floor. The user may then scan the phone again when returning to the parking garage and the pulse will trigger the application which will alert the user as to the location of their car. In another example, a user who needs to visit an entity such as the driver's licensing bureau, a ride at an amusement park, or other potentially high-traffic location which may have a long wait, may receive an IR pulse on their phone which opens an application that may assign them a time to return to the location to take advantage of the service, or may let the user register for a time to return to that location. This would benefit the user because they would then not have to carry an addition device with them to indicate when it is appropriate to return, as may be common when waiting for a dinner reservation, or keep track of a piece of paper with ticketing information, as may be done in some amusement parks or government offices. In another example, a party may attend a technology or gaming conference and the light signal may display a URL or URI on the portable electronic device that contains information about hidden game levels, game hints, or access to unreleased gaming or technology products for regular use or, for example, beta or other pre-launch testing and research. In another example, a user's device may receive an IR pulse which triggers an application that checks them in on at least one social media application to the location where the pulse was received, for example, a house party or night club. In the alternative or in addition, a social media program may launch once the portable electronic device receives an IR pulse. This program may not only "check-in" or otherwise indicate the location of the user's portable electronic device, but also may allow the user to add additional information such as text including other parties who may be at the location. In another example, a user may be taken to a URL or URI that contains job postings for the location where the infrared signal was received, or a subsidiary, parent company, or related vendor or industry.

This technology may be executed when a CPU interacts with an ambient light sensor (ALS) driver and receives indicia, the smart phone or other portable electronic device comprising an ambient light sensor can receive indicia from an IR generator without additional hardware.

Figure 1:
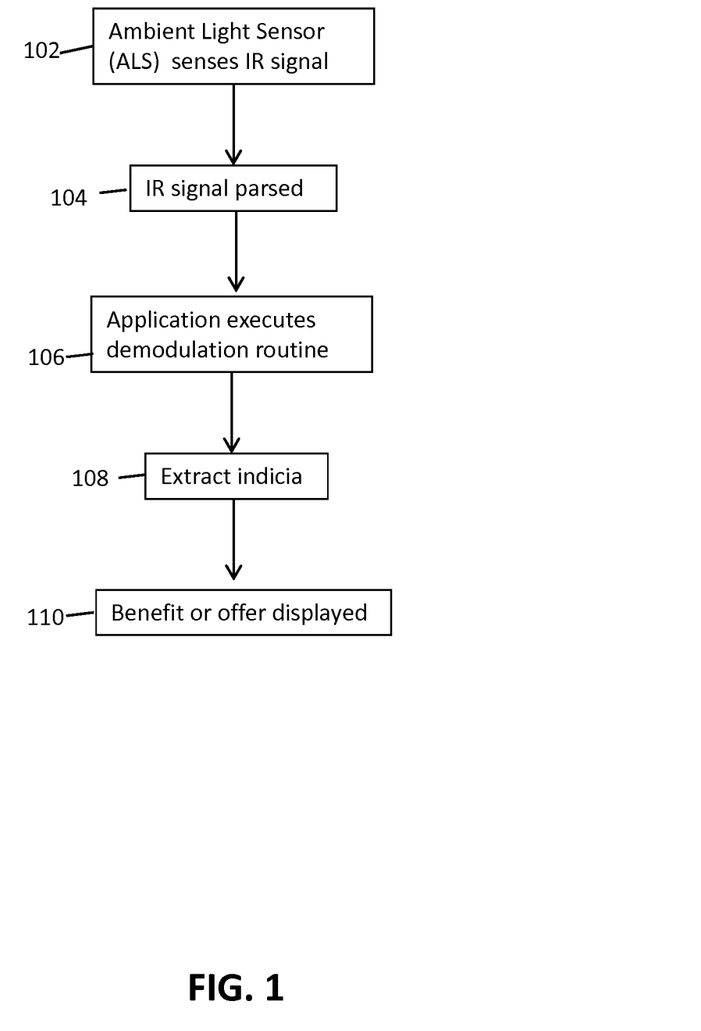
FIG. 1 is an illustration of an embodiment of a method of a portable electronic device receiving offers and benefits using optical indicia.

FIG. 1 is an embodiment of a method of a portable electronic device receiving offers and benefits using optical indicia. The method may be performed by a portable electronic device such as a tablet, personal digital assistant (PDA), mobile phone, or a laptop computer, or other devices comprising an ambient light sensor that is attached to or embedded in the device. At block 102, an ambient light sensor (ALS) senses an infrared (IR) signal. In an embodiment, the IR signal originates from a stand-alone kiosk, from a hand held device, or from a tabletop kiosk, and may be located inside, outside, or in the proximity of a vendor of goods or services. In an embodiment, the IR signal originating device may be at a location with multiple vendors such as an indoor or outdoor shopping mall, outdoor market, exposition, or other event where multiple vendors are present. Because the IR signal is not visible to the user or to other parties, it may not disturb, distract, or otherwise interrupt the activity around where the portable electronic device is placed in proximity to the IR signal. In an embodiment, the IR signal may be provided by the vendor at the location of a kiosk, by a vendor of a related third party service, or by unrelated vendors, for example, who may have paid to have the kiosk installed permanently or rented a kiosk or space on a kiosk for a predefined period of time. In an embodiment, the device that originates the IR signal may be used by multiple related or unrelated vendors or other parties in order to provide benefits to users of portable devices.

At block 104, an application stored in a memory comprising instructions may be executed by a processor coupled to an ALS in response to sending the IR signal and an application executes a demodulation procedure, which may also be referred to as a demodulation routine or demodulation algorithm, at block 106. The demodulation procedure extracts at least one indicia at block 108 and, in response to the extraction of the at least one indicia at block 108, at least one of a benefit or offer is displayed on the portable electronic device at block 110. In an embodiment, the IR signal has a beginning and an end and is parsed to extract and read the code. For example, the IR signal may have framing bits, start bits, stop bits, and the like symbols to designate or delimit a structure of the IR signal. The benefit or offer displayed may be a coupon for current or future use. The coupon may be displayed to the user of the portable electronic device and scanned by an employee at checkout. In an embodiment, the benefit or offer displayed may be a discount available to the portable electronic device for a future purchase, a related purchase, or a purchase at a related vendor or a vendor owned by the same entity as where the portable electronic device was scanned. In an embodiment, the benefit or offer displayed may be, for example, an alert to a future sale or limited discount on an item for present or future purchase. In an embodiment, the benefit or offer displayed may be for a future discount that may be contingent on a purchase made within a predetermined time of receiving the signal.

Figure 2:
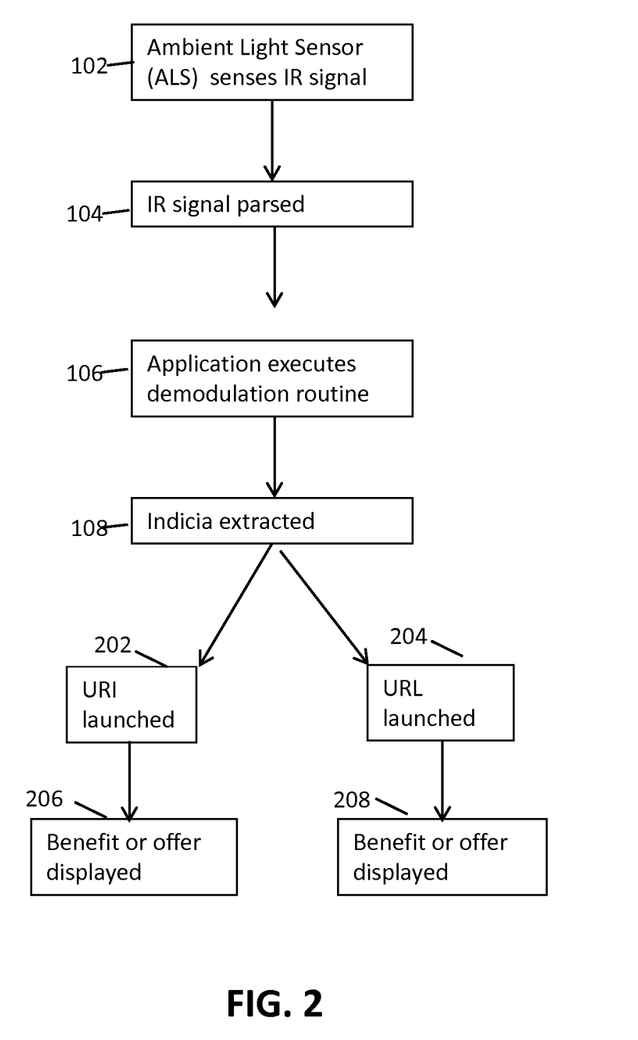
FIG. 2 is an illustration of an alternate embodiment of a method of a portable electronic device receiving offers and benefits using optical indicia.

FIG. 2 is an embodiment of a method of a portable electronic device receiving offers and benefits. The method in FIG. 2 proceeds in a similar manner as the method in FIG. 1 from steps 102-108. In an embodiment, the demodulation procedure extracts at least one indicia at block 108 and, in response to the extraction of the at least one indicia, a URI is launched at block 202. At block 206, the URI launched at block 202 displays a benefit or an offer. In another embodiment, the demodulation procedure extracts at least one indicia at block 108 and, in response to the extraction of the at least one indicia, a URL is launched at block 204. At block 208, the URI launched at block 204 displays a benefit or an offer. In an embodiment, the benefit or offer displayed at blocks 206 and 208 may be, for example, the ability to view a new clothing or accessory collection, the ability to purchase advanced tickets for a sporting, arts, cultural event, or fundraiser. In an embodiment, the URI or URL launched, respectively, at blocks 202 and 204 may be launched at a museum or other entity that would normally have tours led by a person or through pre-recorded handsets given out at the location. Instead, in this embodiment, the portable electronic device displays a URL or URI that contains the tour information and the user can then listen on their own device.

Figure 3:
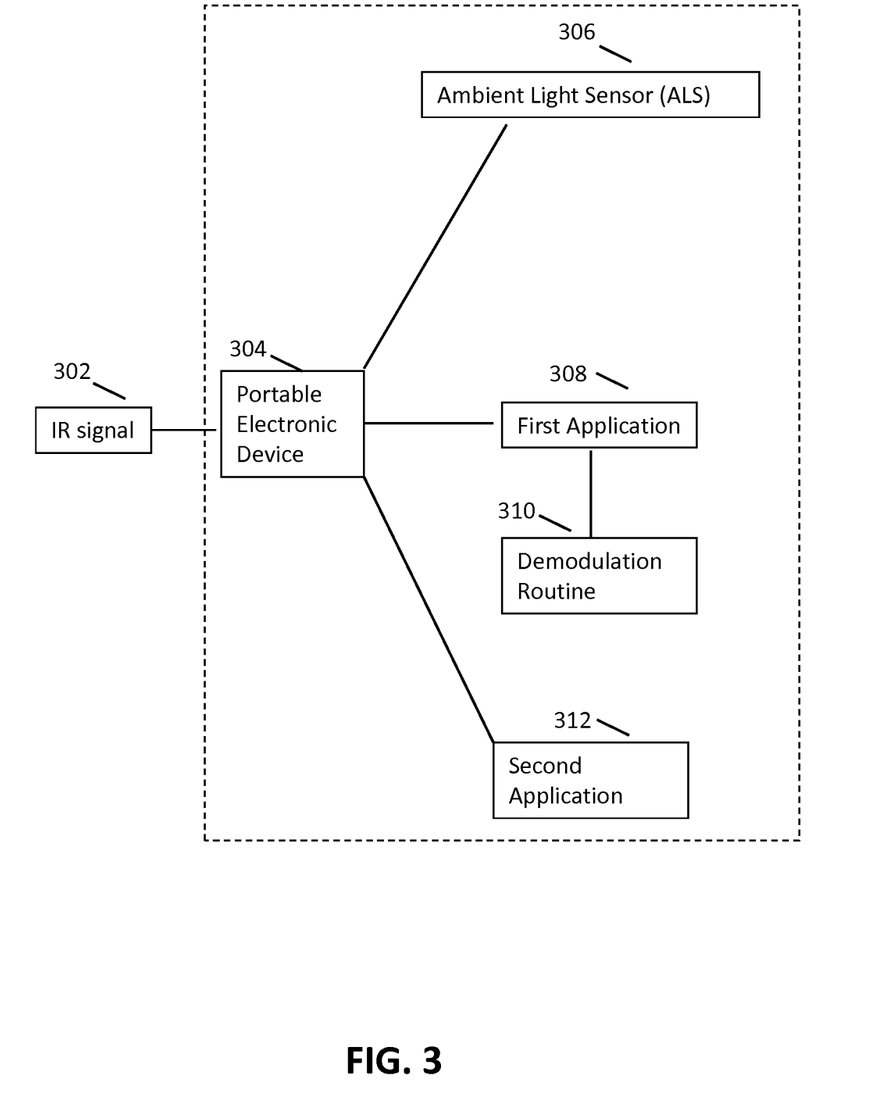
FIG. 3 is an illustration of an embodiment of a system of a portable electronic device receiving offers and benefits using optical indicia.

FIG. 3 is an illustration of an embodiment of a system of a portable electronic device receiving offers and benefits using optical indicia. At block 302, an IR signal is generated and pulsed, and received by a portable electronic device at block 304. The portable electronic device comprises an ambient light sensor (ALS) at block 306, a first application at block 308, and a second application at block 312. The portable electronic device may be, for example, the mobile device depicted in FIG. 4. The ALS at block 306 detects the start of communication from the IR signal at block 302 and the first application 308 is launched. The first application 308 comprises a demodulation procedure which distinguishes the signal by segmentation and/or parsing the signal and determining what is in the transmitted content. The signal may have a beginning and an end to the transmitted content. In an embodiment, the transmitted content may be a code that is recognized from a code dictionary present on the portable electronic device.

In an embodiment, the transmitted content may be a URL or URI. In an alternate embodiment, the transmitted content may be code that that results in the display of a benefit or offer on the portable electronic device. In another embodiment, pictured at block 312, a second application is launched. The second application 312 may allow a user to check in to a social media network or launch another application wherein the user may, for example, check themselves into a location, add parties they are with, add text, or upload photos or links to other URLs, URIs, or applications.

Figure 4:
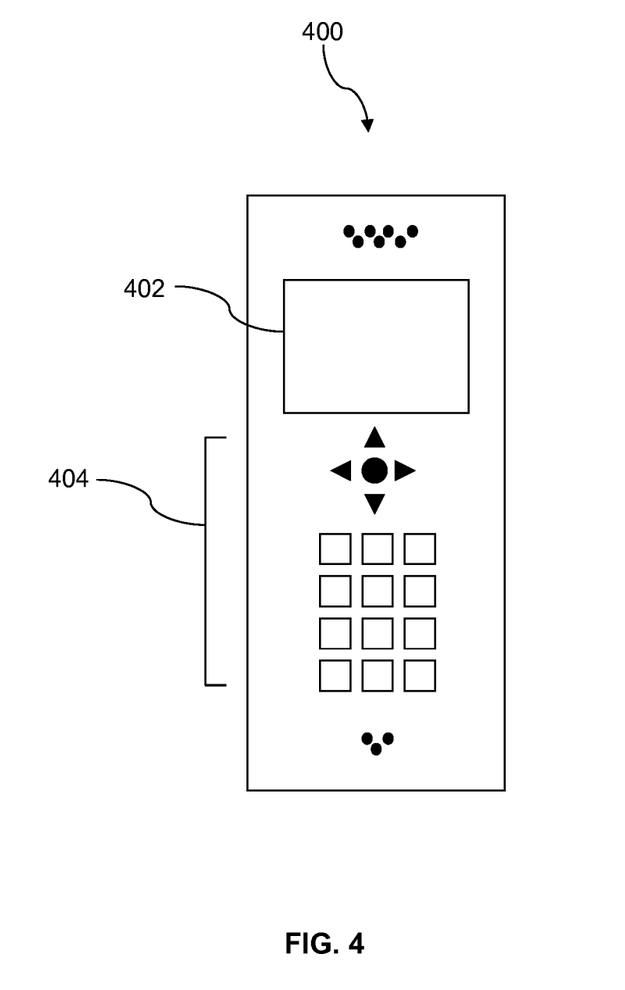
FIG. 4 depicts the mobile device 400.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
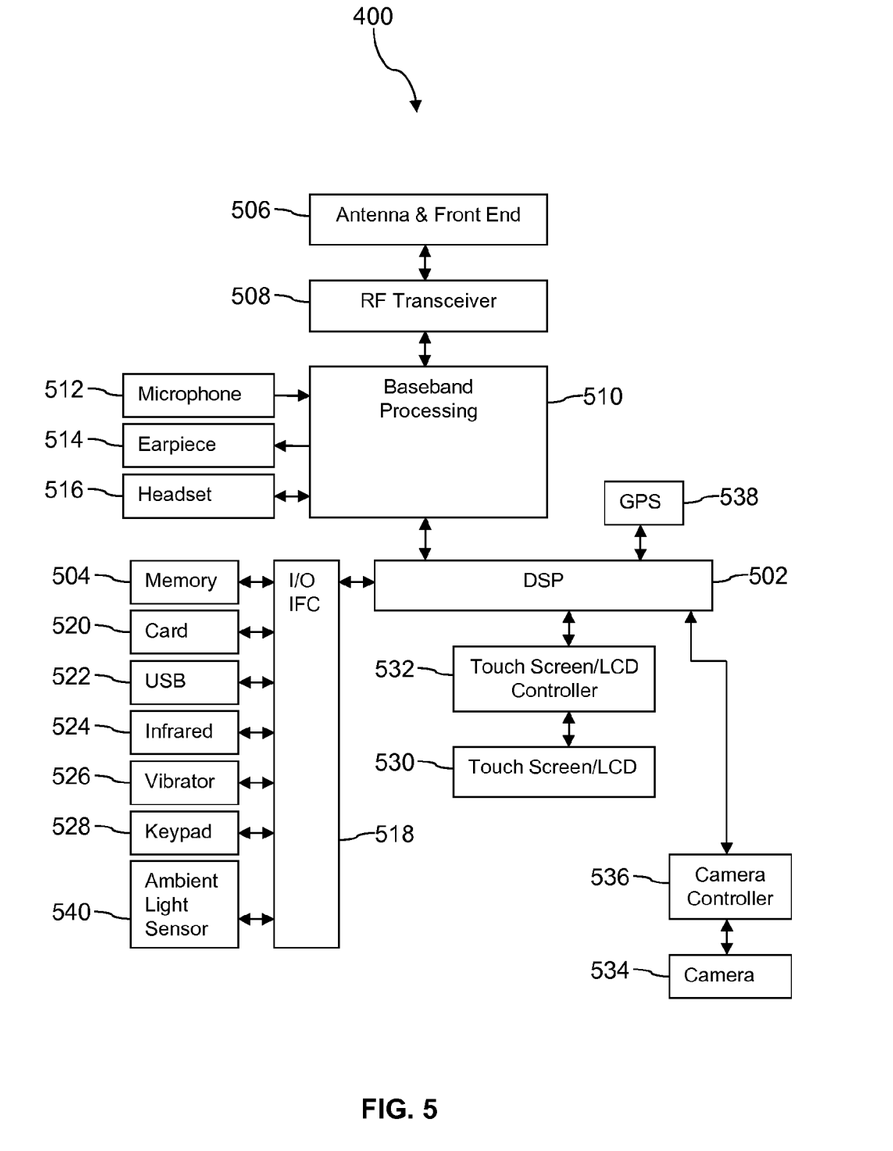
FIG. 5 shows a block diagram of the mobile device 400.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, an ambient light sensor (ALS) 540, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position. The ambient light sensor (ALS) 540 may be coupled to a processor 328 and may be used to adjust the brightness of the touch screen LCD 530 when the ALS 540 detects a change in the light level of the environment. This adjustment may enable the user to more easily see the screen and/or to save power. The ALS 540 may filter the sensed information regarding levels of light using a low pass filter before using the information. In an embodiment, the raw sensor data produced by the ambient light sensor 540 may be intercepted and/or extracted for use by the applications 308, 312 prior to filtering. In this embodiment, the pulsed information may be read at a higher frequency. The ambient light sensor 540 may be designed to be suitable for use in the mobile device 400. For example, the ambient light sensor 540 may be designed and/or manufactured to have a form suitable for incorporating into the mobile device 400. The ambient light sensor 540 may be designed and/or manufactured to have a price point suitable for use in the mobile device 400. The ambient light sensor 540 may be designed and/or manufactured to sense light across a suitable frequency band, for example a frequency band that includes the visible light spectrum, for example from light having wavelengths of about 390 nm to about 750 nm. It is understood, however, that in an embodiment, the ambient light sensor 540 is capable of sensing infrared light in addition to visible light, for example near infrared light.

Figure 6A:
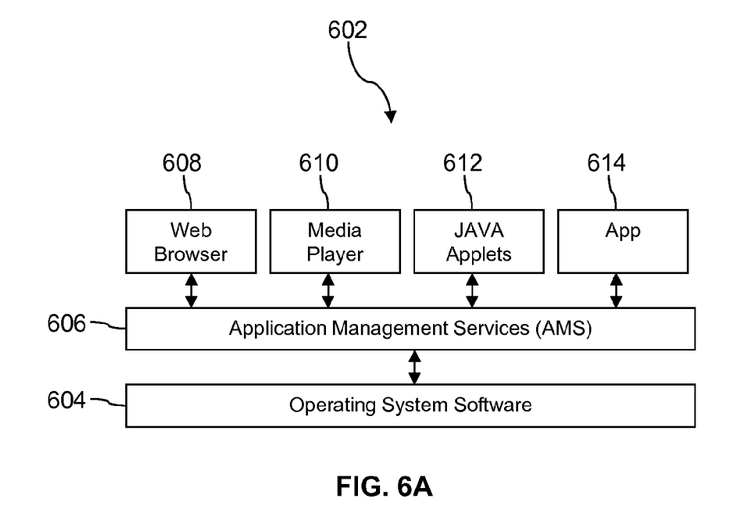
FIG. 6A illustrates a software environment.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality. The application 614 may be executed in response to the detection and parsing of a one-way signal from, for example, an IR source.

Figure 6B:
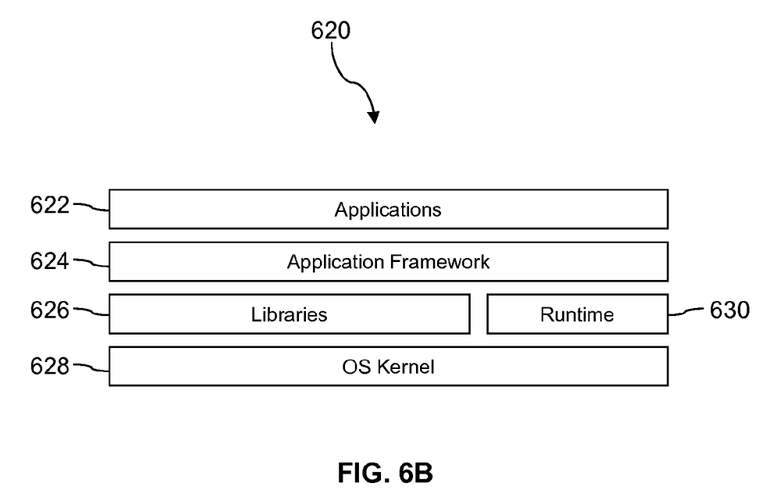
FIG. 6B illustrates an alternative software environment.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
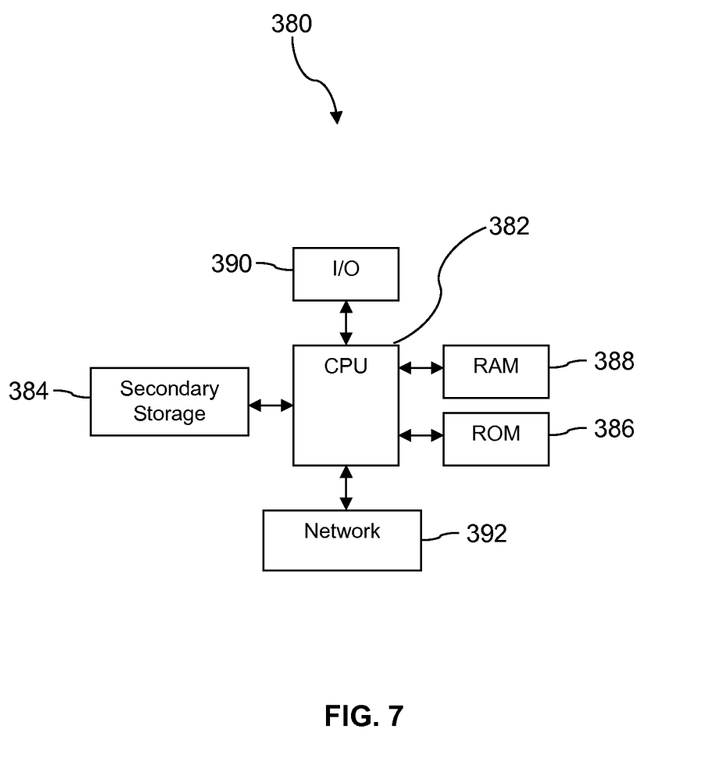
FIG. 7 illustrates a computer system 380 suitable for implementing one or more embodiments disclosed herein.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of one-way communication transmission, comprising:
    sensing, by an ambient light sensor embedded in a mobile phone, a light event;
    determining, by the mobile phone, that the light event is a modulated light signal;
    in response to the determination that the light event is the modulated light signal, parsing, by the mobile phone, an output of the ambient light sensor including the modulated light signal to extract a uniform resource locator (URL) or a uniform resource identifier (URI);
    extracting, by the mobile phone, the URL or the URI from the modulated light signal based on the parsing;
    displaying, by the mobile phone, in response to the extracting, at least one benefit accessed based on the URL or the URI from at least one vendor of a plurality of vendors;
    subsequent to parsing the output of the ambient light sensor and extracting the URL or the URI, averaging, by the mobile phone, remaining raw sensor data of the output produced by the ambient light sensor; and
    adapting a display brightness of the mobile phone based on the averaged raw sensor data.

2. The method of claim 1, wherein the modulated light signal comprises visible light or an infrared signal.

3. The method of claim 1, wherein the mobile phone receives the modulated light signal from at least one of a kiosk or a portable device.

4. The method of claim 1, wherein the modulated light signal is received in at least one of a vendor's retail location, a retail location of a product or service related to the vendor's product or service, a display, a stand-alone site, and an informational booth.

5. The method of claim 1, wherein the benefit displayed is at least one of a coupon for present use, a coupon for future use, an alert to a current sale, an alert for a future sale.

6. The method of claim 4, wherein the parsing comprises detecting at least one of a stop bit, a start bit, or a framing bit.

7. A method of a mobile phone receiving a one-way light communication signal, comprising:
  sensing, by an ambient light sensor embedded in a mobile phone, a modulated light signal;
  parsing, by the mobile phone, an output of the ambient light sensor including the modulated light signal to extract a uniform resource locator (URL) or a uniform resource indicator (URI);
  extracting, by the mobile phone, the URL or the URI from the modulated light signal based on the parsing;
  in response to extracting the URL or the URI, executing, by the mobile phone, an application on the mobile phone;
  connecting, using a cellular communication transceiver of the mobile phone, to a network via a base transceiver station;
  requesting, by the mobile phone via the cellular communication transceiver, content referenced by the URL or the URI;
  displaying content referenced by the URL or the URI on the mobile phone;
  subsequent to parsing the output of the ambient light sensor and extracting the URL or the URI, averaging, by the mobile phone, remaining raw sensor data of the output produced by the ambient light sensor; and
  adapting a display brightness of the mobile phone based on the averaged raw sensor data.

8. The method of claim 7, wherein the modulated light signal is received from at least one of a kiosk or portable device.

9. The method of claim 7, wherein the modulated light signal is located in at least one of a vendor's retail location and a retail location of a product or service related to the vendor's product or service.

10. The method of claim 7, wherein the modulated light signal originates in a location from a display, a stand-alone site, and an informational booth, wherein the display, the stand-alone site, and the informational booth are not affiliated with the location.

11. The method of claim 9, wherein the vendor is a provider of at least one of goods or services.

12. The method of claim 9, wherein the vendor is at least one of an event planner, a venue owner, a management team, and a public relations professional.

13. A mobile phone comprising:
  an ambient light sensor;
  a display;
  a first application stored in a non-transitory memory of the mobile phone that:
    executes in response to the ambient light sensor receiving a modulated infrared signal, wherein the modulated infrared signal is generated by at least one of a stationary kiosk or a portable signal generator, and
    demodulates an output of the ambient light sensor including the modulated infrared signal and extracts a uniform resource locator (URL) or a uniform resource indicator (URI);
  a second application stored in a non-transitory memory of the mobile phone that is launched in response to the extraction of the URL or the URI; and
  a processor that, subsequent to the first application demodulating the output of the ambient light sensor and extracting the URL or the URI, averages remaining raw sensor data of the output produced by the ambient light sensor and adapts a display brightness of the display based on the averaged raw sensor data.

14. The mobile phone of claim 13, wherein the ambient light sensor receives the modulated infrared signal in response to the mobile phone being placed in the stationary kiosk.

15. The mobile phone of claim 13, wherein the ambient light sensor receives the modulated infrared signal in response to being placed in communication with the portable signal generator.

16. The mobile phone of claim 13, wherein the modulated infrared signal is located in at least one of a vendor's retail location, a retail location of a product or service related to a product or service related to the location of the modulated infrared signal, a display, a stand-alone site, and an informational booth.

17. The mobile phone of claim 13, wherein the first application further parses the modulated infrared signal.

18. The mobile phone of claim 13, further comprising a cellular communication transceiver, wherein the cellular communication transceiver connects to a network via a base transceiver station.

19. The mobile phone of claim 13, wherein the second application requests content referenced by the URL or the URI, and wherein the second application presents the requested content.

20. The method of claim 1, wherein the benefit displayed is an application that registers a user of the mobile phone for a return time.

* * * * *